Figure 1:
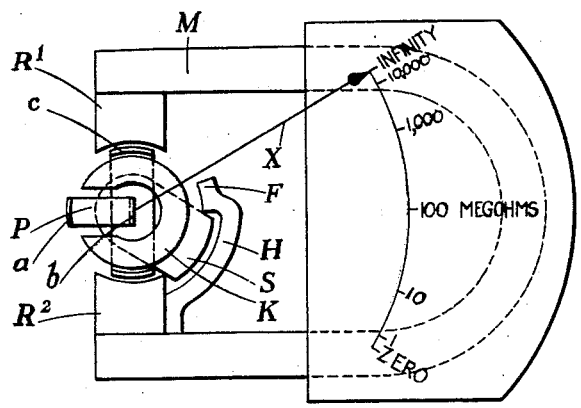

Oct. 31, 1933.     G. B. ROLFE     1,932,911

OHMMETER

Filed Feb. 21, 1931

INVENTOR
George Berkeley Rolfe,
BY
ATTORNEY

Patented Oct. 31, 1933

1,932,911

UNITED STATES PATENT OFFICE

1,932,911

OHMMETER

George Berkeley Rolfe, Chiswick, London, England, assignor to Evershed & Vignoles Limited, London, England, a British company Application February 21, 1931, Serial No. 517,620, and in Great Britain June 4, 1930

4 Claims. (Cl. 171—95)

This invention relates to ohmmeters of the moving coil type, and may, for example be applied to direct reading instruments for measuring resistances of large values, such as are employed in insulation resistance testing.

Moving coil ohmmeters usually include a current coil and a voltage or pressure coil rigidly secured together and free to swing in annular air gaps between the polar faces of the permanent magnet and the central stationary iron core. Usually there is no spring restoring force applied, the position which the moving system takes up being that in which equal and opposite torques are exerted by the two coils. These latter are connected across the electrical supply for which the instrument is designed, the pressure coil directly and the current coil in series with the resistance to be measured. When the latter is an infinite resistance, no current is permitted to flow in the current coil, and the position of the moving system is that dictated by the pressure coil alone. Under these circumstances, the position taken up by the moving system is such that the pressure coil sets itself with its plane at right angles to the centre line of the polar faces of the stationary magnet.

In instruments for measuring high resistances, it is desirable for the scale to be as open as possible near the infinity mark, and consequently in the infinity position it is then usually arranged for the current coil to take up a position in the strongest field. For the same reason, the iron core is usually slotted at right angles to the centre line of the polar faces in order that in the infinity position the pressure coil may operate in a weak field.

Furthermore, the polar faces of the stationary magnet are usually so arranged that as the moving system turns out of the infinity position, the pressure coil progressively cuts a stronger field and the current coil a weaker field. The result of this is to compress the scale at the low resistance end and to enable a wide range of resistances to be indicated.

In spite of this, instruments of this class having the highest sensitivity, such as those required in testing and measuring very high insulation resistances and usually known as high range instruments, cannot include the zero mark on the scale without the provision of series limiting resistances within the instrument of excessively great value, which increase the size and cost of the instrument and have the disadvantage of limiting the voltage applied to the test piece. This is so much the case that it has widely become the custom in these high range instruments to put up with the fact that the lowermost reading on the scale is some considerable resistance.

The object of the present invention is to provide means for increasing the range of resistances measured on a single scale, and particularly to enable the zero to appear on the scale without the drawbacks already mentioned.

Thus, according to the present invention, in order still further to compress the scale at the zero end, the field magnet is provided with one or more additional polar extensions which can act as repulsion horns in such a position that when the moving system is approaching the position of a zero reading, the current coil enters the repelling field due to the horn, and the arrangement is such that a torque is applied to the moving system in opposition to the main deflecting torque.

Figure 2:
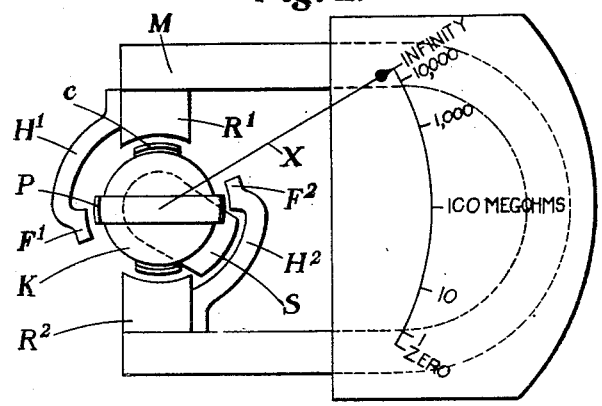
Figure 3:
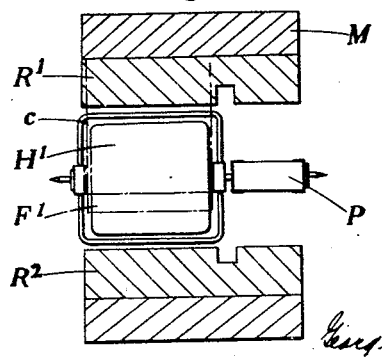

In order that the invention may be clearly understood and readily carried into effect, it will be described in its application to two forms of instrument with reference to the accompanying drawing, in which Figure 1 is a diagrammatic plan showing the magnet system and the moving coil of one form of instrument according to the invention; while Figure 2 is a similar plan; and Figure 3 is a vertical central section, showing the second form of the instrument.

In Figure 1, the invention is shown applied to a form of instrument in which the pressure coil P is a half coil, that is to say, only the outer half $a$ is effective, and the other side of the coil $b$ passes through the axis of rotation. The current coil is shown at C and the main magnet at M with its poles $R^1$, $R^2$. The moving system and the pointer X are shown in the position of infinite resistance with the current coil C in the strongest position in the field. In turning from the infinity position to the zero position, the pointer and the moving system move through a substantial angle of about 50 degrees in the example illustrated, while the single effective side $a$ of the pressure coil swings around from a position of weak field as shown towards the face of the upper pole $R^1$. The net result of this is that neither of the coils ever sweeps around the lower right hand quadrant as seen in the drawing, and this is therefore employed to accommodate the support S for the core K of the stationary magnet.

In this particular case a single horn H is illustrated extending from the lower magnet pole piece $R^2$ and extending around the support S to form a subsidiary pole piece F in the neighbourhood which the upper coil side of the current coil C reaches as the pointer X approaches the zero position. Clearly the polarity of the pole piece F is the same as that of the lower pole piece $R^2$ of the main magnet, and, therefore, opposite to that of the upper pole piece $R^1$ of the magnet opposite which the current coil lies in the infinity position. For this reason the interaction between the horn H and the upper side of the current coil C results in a back torque being applied as the pointer approaches the zero value with the result that the deflection of the pointer X to the zero position from the infinity position is not quite as great as it would be without the horn, and it is a simple matter to design the instrument so that the zero appears on the scale as shown and the graduations on the lower part of the scale generally are compressed. It will be seen that in such an arrangement it is not convenient to make the field structure symmetrical because a similar horn on the opposite side from the opposite pole piece would interfere with the action of the pressure coil P.

However, in the type of instrument shown in Figures 2 and 3, a complete current coil C and pressure coil P are employed but at different positions along the axis of rotation. It is possible to use two symmetrical extension horns $H^1$, $H^2$ which are in position to co-operate with the current coil only, but, the main polar faces $R^1$, $R^2$ and the fixed core K, if such is provided, may have such an axial length as to co-operate with the pressure coil P as well as the current coil C. The axial length of the extension horns $H^1$, $H^2$ is only such, as seen in Figure 3, that the current coil C enters the fields due to them. The action in this case is substantially the same as in the example already described above, with the exception, of course, that the repulsion action in this case is effected on both sides of the current coil C instead of one side only.

With the novel system in accordance with the invention, it is possible to construct a high range ohmmeter having its zero graduation on the scale and with a comparatively low current limiting resistance.

I claim:—

1. A direct reading ohmmeter, comprising in combination, a stationary field magnet, a current coil and a voltage coil rigidly secured together to constitute the moving system of the instrument and mounted to move with respect to said field magnet, and a polar extension magnetically and mechanically connected to one pole of said field magnet and located to act upon said current coil to oppose the deflecting torque when said moving system moves towards the position of zero resistance of the instrument.

2. A direct reading ohmmeter, comprising in combination, a field magnet, a current coil and a voltage coil rigidly connected together to constitute the moving system of the instrument, said coils being relatively displaced along their axis, and a polar extension magnetically and mechanically connected to one pole of said field magnet and located to act on said current coil alone when said moving system moves towards the position of zero resistance of the instrument.

3. A direct reading ohmmeter, comprising in combination, a bi-polar field magnet, a current coil and a voltage coil rigidly connected together to constitute the moving system of the instrument, said coils being relatively displaced along their axis, and a pair of polar extensions each mounted upon and magnetically connected to one of the poles of said field magnet and extending into such a position as to act upon said current coil alone when said moving system moves towards the position of zero resistance of the instrument.

4. A direct reading ohmmeter, comprising in combination, a bi-polar field structure, a current coil and a voltage coil forming a moving system mounted to turn about an axis, one side of said voltage coil passing through said axis and a polar extension mounted upon one pole piece of said field structure and extending around the quadrant of movement of said moving system through which neither of said coils sweeps during deflection of the instrument.

GEORGE BERKELEY ROLFE.